INVENTORS.
JAMES B. ANDERSON and
KENNETH A. BAKER
By
Christy, Carmeler, & Strickland
Attorneys INVENTORS.
JAMES B. ANDERSON and
KENNETH A. BAKER
Attorneys

Flow Valve Closed (0-15)    First Air Chamber (3-13)    Second Air Chamber Close (8-13)    Pulse to Pacer (10-13)

United States Patent Office 3,252,618
Patented May 24, 1966

3,252,618
MATERIAL TRANSFER SYSTEM AND METHOD WITH AUTOMATIC RATE CONTROL
James B. Anderson, Mount Lebanon, and Kenneth A. Baker, McKeesport, Pa., assignors to H. J. Heinz Company, Pittsburgh, Pa., a corporation of Pennsylvania
Filed Aug. 1, 1963, Ser. No. 299,391
19 Claims. (Cl. 222—1)

This invention relates to the transfer of material from a supply source or station to a receiving vessel or station at a controlled rate, and more particularly to such a system utilizing the periodic measurement of the rate of flow by detecting the change in weight or volume in a given time cycle by means of a measuring vessel interposed between the two stations into or from which the passage of material is stopped while the other station continues to discharge material into or receive material from the measuring vessel, and wherein the measured rate is utilized automatically to speed up or retard the transfer of material for an ensuing time interval before the next period of measurement to thereby maintain a preselected constant hourly rate of transfer. The invention is further adapted to record the total amount of transferred material as well as the rate of transfer.

In many manufacturing operations, especially those which are continuous as distinguished from batch processes, ingredients of some nature such as liquids, pulverulent, granulated and particulate and other like bulk, solids, as well as mixtures or slurries, are carried from a supply source to a receiver, such as a mixer, blender, cooker or the like, at a predetermined rate. In other cases, materials are required to be discharged from a cooking or processing vessel at a substantially constant and uninterrupted rate. In the food industry, examples are tomato paste, vinegar, spice mixtures, slurries, and beans, sugar, salt, pomace, flour, etc., these being mentioned merely as typical materials which may be required to be transferred at a preselected rate in one of the many industries to which the invention is applicable.

At the present time very expensive equipment is necessary to secure reasonably accurate feed or discharge control, such as a pair of loss-of-weight hoppers so connected into a material transfer system that one is being completely filled while the other is being completely emptied. Such systems are not only expensive but are relatively bulky, requiring substantial accessible plant space for their use.

The present invention provides a measuring vessel in a material transfer system between two stations or vessels through which the entire flow of the material being transferred is channeled. A material transfer prime mover, such as a pump with a variable-speed drive in the case of fluent material transfer, or a variable-speed drive for a transfer mechanism such as a screw or a belt conveyor in the case of solid material transfer, is operatively included between one station and the inlet to the measuring vessel, or between the other station and the discharge outlet from the measuring vessel. Also, it is contemplated that a flow control valve may be included between stations, the valve openings being controlled by the system to regulate the rate of material flow. At predetermined regular and preferably frequent time intervals the discharge of material into or from the measuring vessel is stopped while the prime mover continues to function and the change in level, weight or volume of material in the measuring vessel is sensed for a definite short period of time. The sensed change is transmitted to an automatic control system. A controller differentiates the actual or measured change of volume, weight or level in the vessel with a preselected value, speeding up or slowing down until the next measuring cycle the said drive if the rate of flow reflected by the measured value does not equal the desired or preselected value. The controller effects no change of speed of the drive if the measured value matches the preselected value. The transfer of a material in that portion of the system between one station and the measuring vessel that is stopped during each sensing interval always operates at a speed sufficient to restore a measurable level, volume or weight in the measuring vessel before the next testing cycle. The prime mover or drive is operated continuously, transferring material to or from the measuring vessel, so that notwithstanding the stoppage of flow between one station and the measuring vessel, the flow into or from the other station is not interrupted.

The invention therefore has for its principal object to provide a method of and an apparatus for periodically measuring the actual rate of transfer of material to or from a measuring vessel, detecting any variation between the actual rate and a pre-established required rate, and adjusting the actual rate to maintain the required average rate.

Another object is to provide a rate of flow metering system for maintaining an uninterrupted continuous, substantially uniform rate of transfer of material into or away from one vessel, receptacle or station.

A further object is to provide a new and improved method of and apparatus for automatically controlling the rate of flow of a material between a source of supply and a receiver.

Still another object is the provision of a system for metering material by automatic control which is compact in construction and positive in operation and relatively inexpensive compared to other means now available for accomplishing the same purpose.

A complete understanding of the invention may be had from the following detailed description of specific embodiments thereof when read in conjunction with the appended drawings, wherein.

Figure 1:
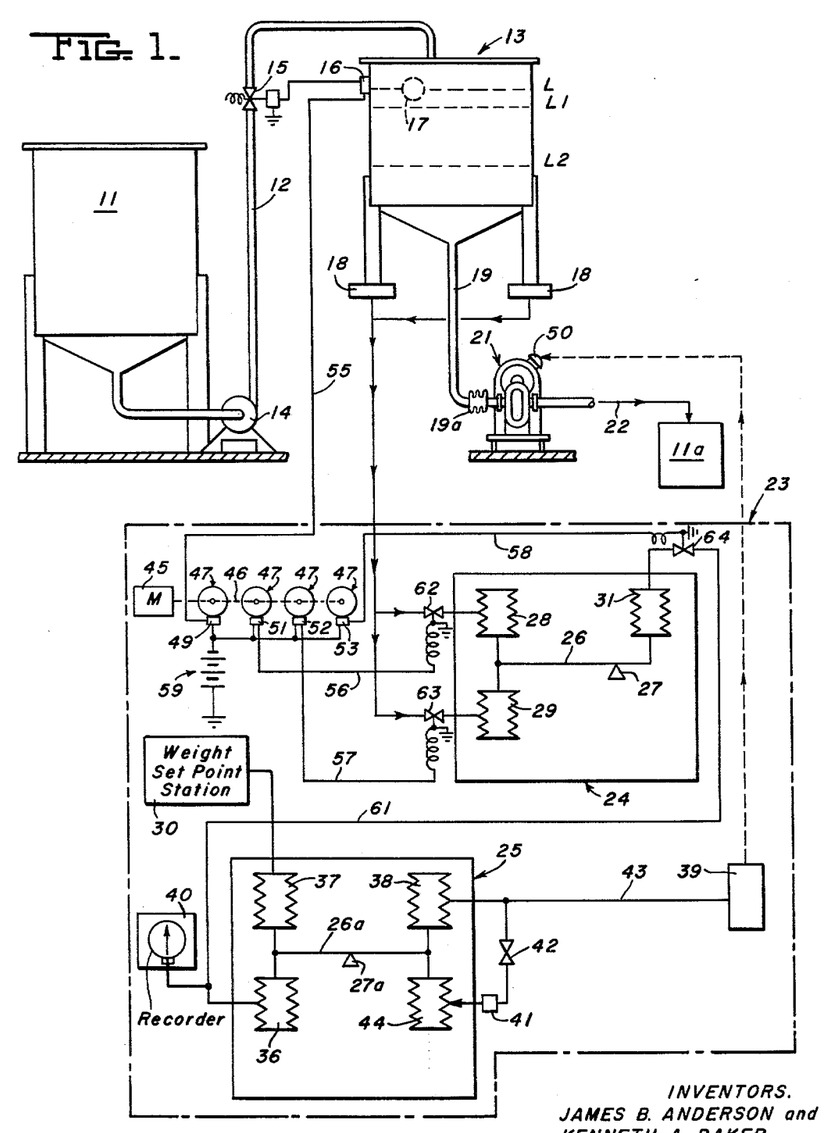
FIG. 1 is a pictorial diagram of the system comprising one embodiment of the instant invention.

Referring now to the drawings, wherein like reference characters designate like or corresponding parts throughout the several views, there is shown in FIG. 1 a supply vessel 11 from which liquid or flowable solid material is discharged at an intermittent rate into an intermediate vessel, hereinafter referred to as a measuring vessel 13, for passage to a receiving vessel at a continuous, substantially uniform rate of flow. For example, the material supplied may be a food ingredient being blended in a receiving container or continuous mixer 11a at an uninterrupted average uniform rate.

The supply vessel 11 is arranged to deliver material by a conduit 12 to the measuring vessel 13, and material is moved through the conduit by suitable means such as a pump 14. A valve 15, which is spring-biased to close, and which is electromagnetically opened, is positioned in the conduit 12 at a point intermediate the supply vessel 11 and the measuring vessel 13, the valve being controlled by a switch 16 operated by a float arm 17 in vessel 13 during periods of normal operation of the system as opposed to the test periods thereof. When the float rises to a predetermined level, the switch 16 is opened and the valve 15 closes. This switch is in series with a timer or programmer hereinafter described.

The measuring vessel 13 is supported on pneumatic load cells 18 for the pneumatic sensing of the weight of material within the vessel. The material is transferred through a pipe 19 which includes a flexible section 19a and which connects the bottom of the measuring vessel 13 to a motor driven variable speed pump 21. The pump is provided for transmission of the material to a receiving vessel 11a which is located on the discharge side of the pump, the direction of flow being indicated by arrow 22.

*Pneumatic automatic control system*

It is a function of the instant invention shown in FIG. 1 to regulate the rate at which liquid or solid material is discharged into the receiving vessel 11a from the vessel 13 by action of the pump 21 through variation of the speed of the pump, and to record the total amount of transferred material. One method of achieving these functions is to employ an automatic pump control system generally designated 23, FIG. 1. It includes at least two computers or resolvers 24 and 25 containing diaphragm chamber units of the type shown in detail in FIG. 9. By means of the resolvers, difference between actual change in weight, level or volume of ingredients in the measuring vessel 13 and a predetermined set value is computed, and the speed of a pump is regulated accordingly. Inasmuch as these resolvers are of known construction, forming no part per se of this invention, a detailed description of the resolvers is unnecessary. In brief, the resolvers are identified as Ratio Totalizers which are manufactured by Hagan Chemicals and Control, Inc., of Pittsburgh, Pennsylvania. These instruments are described more completely in the corporation Bulletin MSP–120A.

For purposes of description, the computers or resolvers 24 and 25 include arms 26 and 26a, respectively, on which are mounted diaphragm chambers 28, 29, 31, 36, 38 and 44. The chambers 31 and 38 generate output signals which reflect the difference or the proportional difference between the amount of pressure present in chambers 28 and 29, and 36 and 31, respectively. Fulcrums 27 and 27a are provided which may be adjusted on the arms 26 and 26a to vary the proportional output of the signals generated by the chambers 31 and 38. A recorder 40 is placed in the output line from the chamber 31 for the indication of the rate of flow and the total amount of material which is transferred by the system over a given period of time. Assuming the output pressure generated by the chamber 31 is 7 pounds, this pressure is transmitted both to the recorder 40 and the chamber 36 of the resolver 25. A set point pressure of 16 pounds, for example, is placed on the diaphragm of chamber 37 by the weight set point pressure station 30. Inasmuch as the fulcrum 27a of the arm 26a is located at the approximate midpoint of the arm 26a, the chamber 38 will generate a signal which is the difference between the 16 pound pressure in chamber 37 and the 7 pound pressure in chamber 36, or 9 pounds. The output pressure of 9 pounds from chamber 38 is transmitted to a positioning device 39 for a speed control mechanism of a prime mover such as pump 21, and, if the pressure is equivalent to that desired for the normal operation of the system, the device 39 will not be actuated. On the other hand, if the output signal from chamber 38 is 6 pounds, which is below the desired output pressure of 9 pounds, for example, the positioning device 39 will be actuated to decrease the speed of the pump 21. A reset mechanism may be employed in the resolver 25 for the integration of the output signal generated by the chamber 38. The reset mechanism includes a volume tank 41 and a needle valve 42 which are interconnected to chamber 44 and chamber 38. The output pressure generated by chamber 38 is transmitted to the dead-end chamber 44 through the needle valve 42 and volume tank 41. This action produces an integration of the output signal transmitted from the chamber 38 to the control positioner 39, maintaining the output signal within a limit for the operation of the positioning device 39.

*Programmer for pneumatic control system*

Figure 8:
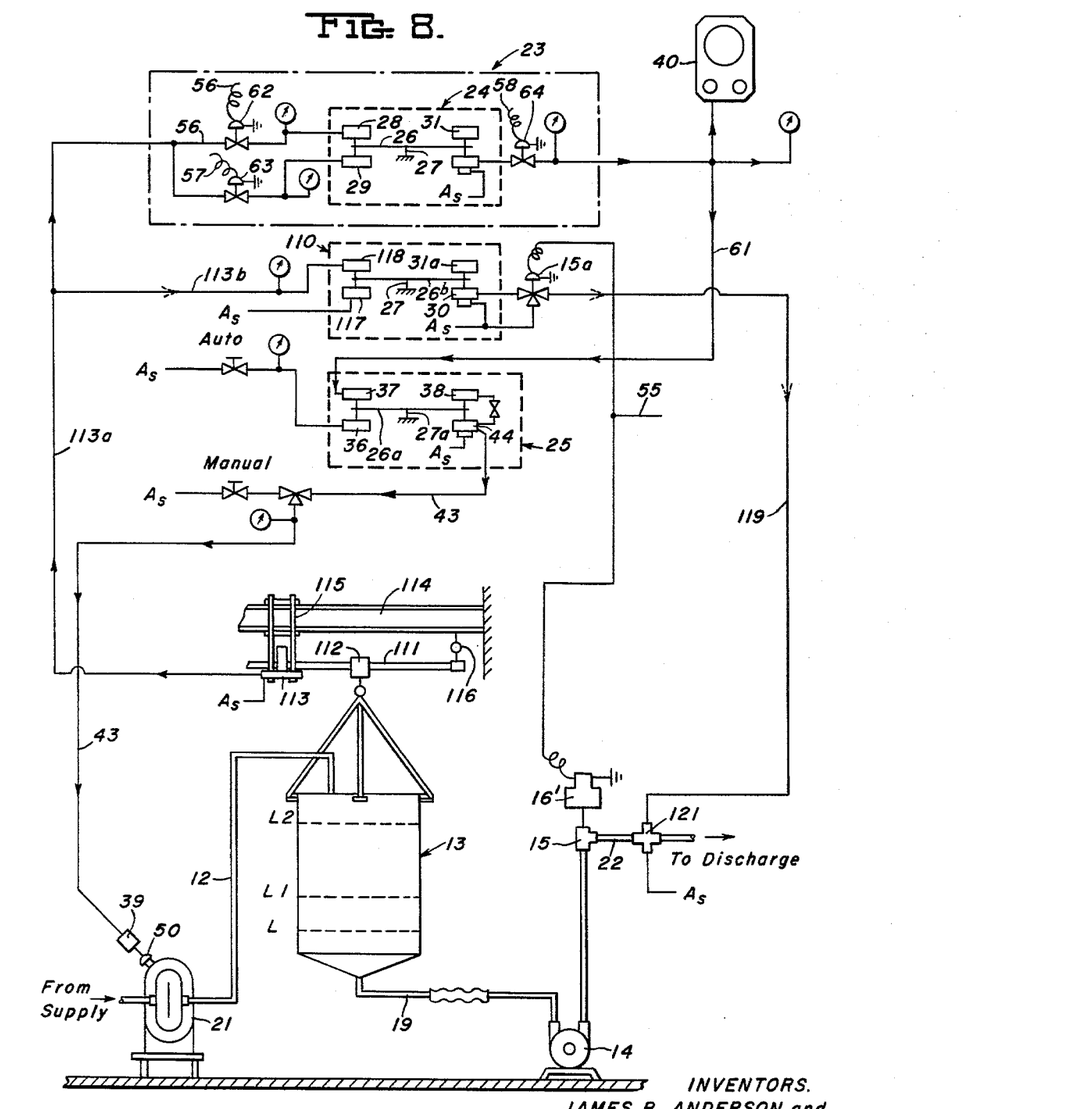
FIG. 8 is a diagram of another modification of the invention in which the rate of flow is measured by material gain-in-weight in the measuring vessels, the measuring vessel being here shown suspended from a scale beam instead of being on a load cell.
Figure 10:
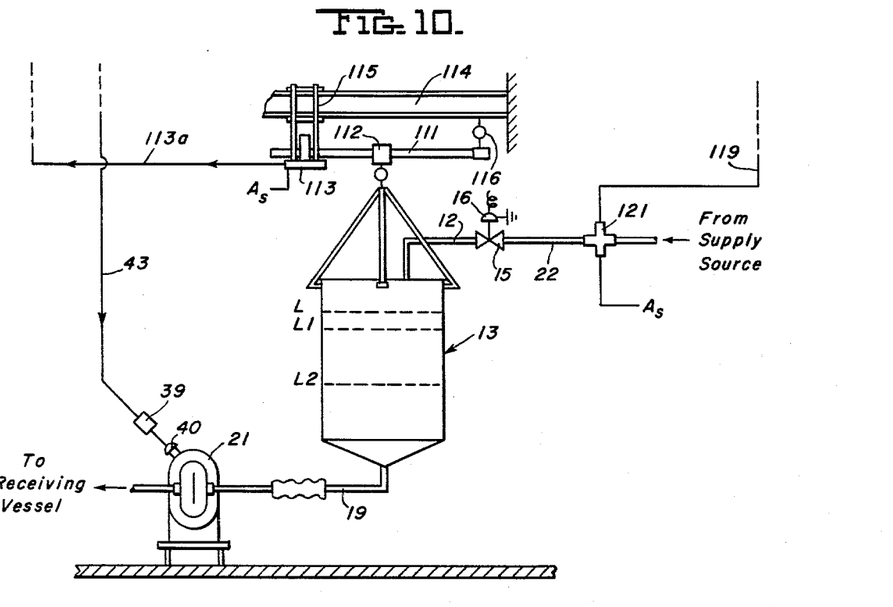
FIG. 10 is a fragmentary view of the apparatus shown in FIG. 9 but wherein the system functions on a loss-of-weight control principle.

The sampling period of the rate of transfer of material from the measuring vessel 13, FIGS. 1, 8, and 10, may be for fifteen seconds for each minute, for example, which necessitates stopping of the supply of ingredients through the conduit 12 for each period of loss-of-weight measurement. This action is accomplished by the programmer illustrated graphically in FIG. 1 and in enlarged detail in FIG. 11 which includes a motor 45 with a shaft 46 having a plurality of cams 47 positioned thereon. The cams are rotated clockwise at an angular velocity such that a complete revolution of each cam is accomplished each minute. The cams 47 are shaped with lobes 48, FIG. 11, the lobe 48a of a first cam from left to right having an arc equal to forty-five seconds of time and terminating at 0 seconds and starting at 15 seconds, since the function of this cam is to break the circuit which holds valve 15 open. A lobe 48b of a second cam has an arc equivalent to the period three seconds after the zero second to thirteen seconds. Lobe 48c of a third cam has an arc with a time period extending from eight seconds after the zero second to thirteen seconds, and lobe 48d of a fourth cam has an arc period from the tenth second to the thirteenth second. Cam-operated microswitches 49, 51, 52 and 53 are arranged in the path of travel of the cam lobes 48a, 48b, 48c and 48d, respectively, and are closed when the respective lobes contact the microswitch followers or plungers 54 to open or complete, as required, electrical circuits through lines 55, 56, 57 and 58, respectively, to a battery 59 or other electric current source for actuation of solenoid operated valves 15, 62, 63 and 64 in the order named and for the time periods determined by the arc time of the lobes associated with the valve solenoids.

*Pneumatic automatic control operation*

Briefly stated, the sampling cycle of the modifications of the metering system illustrated in FIGS. 1, 8, and 10 is initiated when the solenoid-operated spring-biased valve 15 in each modification is closed by movement of the cam lobe 48a from under the follower of the microswitch 49. This opens the electrical circuit between the valve 15 and the electric current source 59. Three seconds after the closing of the valve 15, for example, a normally-open solenoid valve 62 in the line joining the pneumatic-weight cells 18 with the chamber 28 of the resolver 24 is closed for a period of ten seconds; that is, from three seconds to thirteen seconds of the time of the sampling period. Input pressure is thus locked into the chamber 28 of the resolver 24 by the closing of the valve 62. Five seconds after the closing of the solenoid-operated valve 62 a similarly operated, normally-open solenoid valve 63 in parallel with the valve 62, and in series with the load cells 18 and the chamber 29, is closed, locking the pressure at that time in chamber 29 of the resolver 24. Since the material within the measuring vessel 13 continues to be discharged by the uninterrupted action of the pump 21 during the sampling period of fifteen seconds, different material weights represented by distinct air pressures are thus registered within the chambers 28 and 29 of the resolver 24. The ratio or difference between these two input signal pressures is the output signal pressure generated by chamber 31. A normally-closed solenoid-operated valve 64 in the output signal pressure line 61 from the resolver 24 is opened ten seconds after the beginning of the sampling period in order that the output pressure from chamber 31 is transmitted into the chamber 36 of the resolver 25 to be locked therein two seconds after the closing of the valve 63. At the thirteenth second of the fifteen second sampling period, the cam lobes 48b, 48c and 48d have co-acted with the followers of their associated microswitches 51, 52 and 53; accordingly, the valves 62 and 63 are no longer energized or actuated by the circuit associated with each, and the solenoids of these valves are de-energized to return the valves to a normally-open condition. The valve 15 is returned to open condition only after the expiration of the full fifteen seconds as dictated by the cam lobe 48a in association with the microswitch 49.

After expiration of the fifteen second sampling period, the position of float 17 of the vessel 13 again physically controls the valve 15 to prevent overflow of the level of ingredients in vessel 13 for the remaining or non-sampling period of forty-five seconds, for example. The cycle is repeated when the zero point on the first cam is again reached. The input pressures to chambers 28 and 29 are the same at each instant of the non-sampling period such that the chambers are in condition for the next testing or measuring cycle. The valve 64 is maintained closed during the non-measuring period of operation.

The rate of supply of material to the measuring vessel is greater than the rate at which material is discharged from it so that the measuring vessel will come up to a measurable level before the next sampling cycle. The three second interval between the closing of the valve 15 and the operation of valve 62 is to allow for any overrun or drip from the pipe into the measuring vessel after the valve 15 closes and before actual change of weight detection is initiated. It will be observed that while the supply to measuring vessel 13 is cut off during the sensing cycle, the discharge of material for transfer to the receiving station is uninterrupted. Should there be an over-adjustment of the speed of the pump 21 on one cycle, there will be a correction on the following cycle so that the mean or overall rate over a period of time is uniform. The measuring vessel must of course have sufficient capacity so that it will never be completely emptied in any sensing cycle.

In the foregoing illustration, the rate of feed to the receiving vessel is controlled. In some case, it may be desirable to control the rate of feed from the supply source. In such case the valve 15 is located on the output side of the measuring vessel and the variable speed drive or pump is on the input side. The float is then arranged to control the minimum level in the measuring vessel and the gain-in-weight while valve 15 is closed then is de-tected and translated into a signal for pacing the speed of the prime mover.

Such a system in another form is shown in FIG. 8 hereinafter more fully described.

*Electrical automatic control system*

Figures 2, 3, 4:
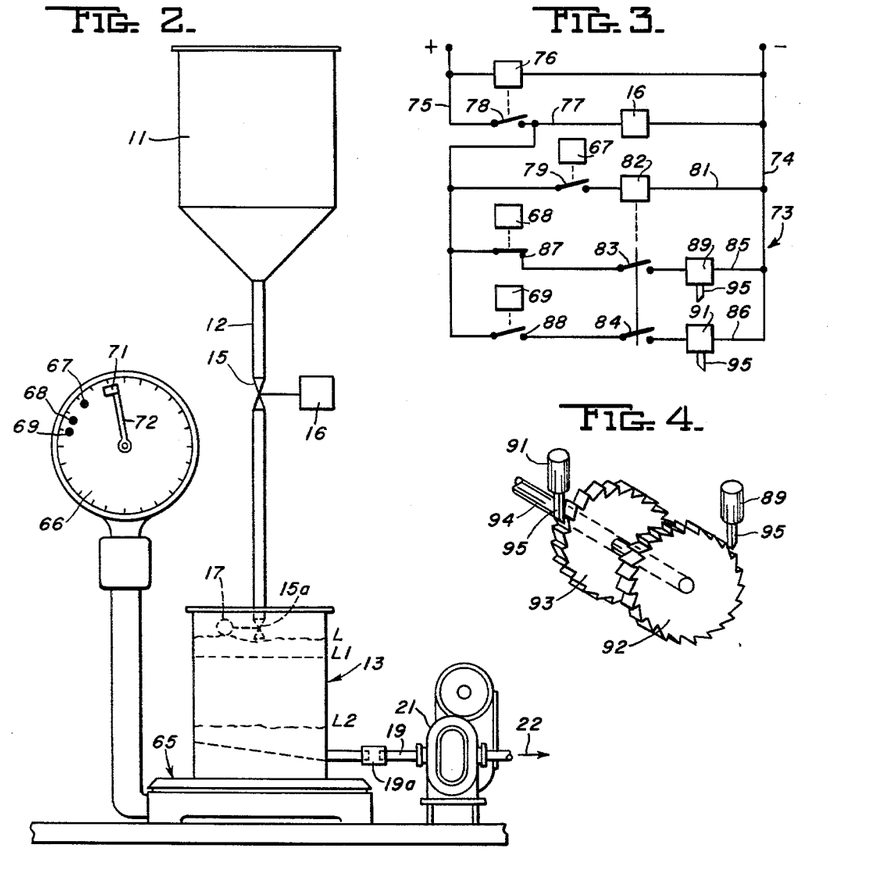
FIG. 2 is a pictorial diagram of a second embodiment of the invention for the controlled metering of liquid material to one vessel from another by an electro-mechanical system.
FIG. 3 is a graphical diagram of an electrical relay circuit for the operation of the invention depicted in FIG. 2.
FIG. 4 is a fragmentary perspective detail view of a part of a mechanism for regulation of a drive motor speed controller comprised in the automatic electrical control of the metering system shown in FIG. 2.

In FIG. 2 there is shown an electrically controlled metering system as contrasted to the pneumatic system just described in regard to the embodiments of the invention depicted in FIG. 1. The supply tank 11 is flow-connected by the conduit 12 to the metering vessel 13, and the shut-off valve 15 is positioned across the conduit to open and close the conduit responsive to the valve controller 16, just as in FIG. 1. A second valve 15a is located at the discharge end of the conduit 12 and is controlled by the float 17 whereby overflow of the vessel 13 is prevented. Levels L–1 and L–2 of the measuring vessel 13, for example, indicate the different levels reached by the material during discharge by the pump 21 in a sampling period to be described more fully hereinafter. The vessel 13 is mounted on a mechanical scale 65 by which means the loss-of-weight of ingredients emptied from the vessel 13 is sensed.

Figure 7:
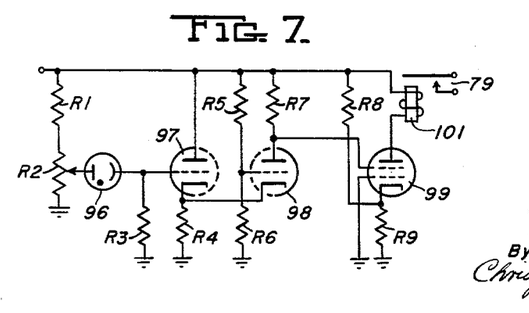
FIG. 7 is a schematic of one form of a phototube relay circuit associated with the relay circuitry of FIG. 3.

The dial 66 of the scale 65 has positioned in a common arc radially-spaced phototubes 67, 68 and 69 which lie immediately beneath the path of travel of a flag 71 fixed to a dial sweep arm 72 which is responsive to the change of weight of the ingredients in the vessel 13. A source of light, not shown, is directed toward each of the phototubes 67, 68 and 69 in the form of separate beams, one for each of the tubes. As the flag 71 passes each tube, the respective light beam is interrupted, and the interruption triggers an associated phototube circuit shown in FIG. 7, which illustrates a typical phototube circuit, wherein phototube 96 designates a phototube typical of the phototubes 67, 68 and 69 of FIGS. 2 and 3. Assuming a beam of light is impinging on the cathode of the phototube 96; the grid of the triode 97 is driven positive by the anode of the phototube, causing the cathode follower 97 to rise out of cut-off. This increased current places the common cathode of tube 97–98 at a positive potential at which the tube 98 is at cut-off. As this happens, the plate voltage of tube 98 surges upwardly carrying the screen grid voltage of a relay tube 99 with it which makes the tube 99 conduct heavily and pull in the plate-circuit relay 101 to close contacts 79. With conversion of this circuitry, operation of the normally-closed contacts 87 or normally-open contacts 88 of the circuitry of FIG. 3 is made possible.

*Programmer for electrical control system*

The actual timing sequence of interruption of the phototubes 67, 68 and 69 by the flag 71 is compared with the desired timing sequence of interruption which is representative of the desired discharge rate of material from the vessel 13 by means of the comparison circuitry shown in the electrical diagram of FIG. 3 whereupon the speed of the pump 21 is varied to attain the correct average rate of feed to a receiving means or vessel.

In FIG. 3 the electrical schematic is shown for regulation of the pump 21 for slowing or advancing the speed of the pump motor and includes a typical ladder circuit designated 73 with leads 74 and 75 connected to a suitable current source, not shown. A programmer or timing relay 76 is preset to actuate the valve controller 16, FIGS. 2 and 3, to close the cut-off valve 15 in conduit 12 for a period of fifteen seconds each minute, for example, by completing a circuit across the leads 74 and 75 through line 77 by closing contacts 78 of relay 76. This action stops the feed of ingredients from the supply tank 12 to the sensing vessel 13. The continued discharging of ingredients by the pump 21 from vessel 13 causes a loss of weight of ingredients or material within the vessel which is registered on the scale 66, causing the indicating arm to rotate in a counter-clockwise direction, FIG. 2.

Operation of electrical control system

The operation of the circuitry 73 of FIG. 3 proceeds on the assumption that the ingredients in the sensing vessel 13 of FIG. 2 is at level L. The timing relay 76 at preset intervals, say for fifteen seconds each minute, actuates the controller 16 to close the valve 15 for the selected interval, after which time interval the valve 15 opens for the remaining forty-five seconds with maintenance of the material level governed by the valve 15a as regulated by float 17 to avoid overflow. The functions of the circuitry of FIG. 3 thus takes place in the sampling period of fifteen seconds regulated by timing relay 76, during which time the valve 15 is closed. The interruption of light normally impinging on the phototube 67 by the flag 71 actuates the relay circuit of FIG. 7 to cause the contacts 79 to close, thus energizing the delay relay 82. After a selected period of time less than the fifteen second sampling period as controlled by relay 76, contacts 83 and 84 are closed only momentarily and simultaneously by the relay 82.

The energization of speed control solenoids 89 and 91, FIGS. 2, 3 and 4, is dependent upon the conditions of the contacts 87 and 88 which are arranged to be operated by interruption by the flag 71 of a beam of light to each of the phototubes 68 and 69. First, if the flag 71 has not reached the phototube 68 at the time of instantaneous closing of the relay contacts 83, the normally-closed contacts 87 are not disturbed and the solenoid 89 is energized. Next, as the flag 71 disturbs the light path to phototube 68, its associated normally-closed relay contacts 87 are opened. Secondly, if the flag 71 has reached a position between the phototube 68 and the phototube 69 whereby the contacts 87 are open at the time of momentary closing of relay contacts 83 and 84, neither solenoid 89 nor solenoid 91 is energized. The third and last condition is that if the flag 71 has arrived at the phototube 69 at the time of instantaneous closing of relay contacts 83 and 84, an electrical path is completed to the solenoid 91 by the closing of normally-open contacts 88 of the relay circuit including phototube 69, and the closing of the contacts 84 of the delay relay 82.

In summation, the sampling period of fifteen seconds is repeated by operation of the timing relay 76. During this period the delay relay 82 simultaneously and momentarily closes the relay contacts 83 and 84 at a set time after the flag 71 passes the tube 67. The interruption of the light beams to the phototubes 68 and 69 by the flag 71 of the dial arm 72 may or may not take place at the moment of time of instantaneous closing of the contacts 83 and 84, and this condition determines which, if either, of the solenoids 89 and 91 are energized. In other words, the time the flag 71 requires to pass from the phototube 68 to tube 69 is compared electrically with the time determined for a desired loss-of-weight of ingredients in the vessel 13 to occur.

The variable speed control mechanism shown in FIG. 4 is responsive to the energization of the solenoids 89 or 91 which selectively rotate either one of two ratchet wheels 92 and 93 fixed to a shaft 94 which is cooperatively engaged to a variable speed motor controller, not shown. Typically, when the shaft is rotated incrementally in one direction, here illustrated as clockwise, the variable speed of a drive, such as a motor controller, not shown, is increased. Upon rotation in a counter-clockwise direction, the variable speed of the drive is reduced. The solenoids 89 and 91 are provided with plungers 95 which rectilinearly engage the teeth of the ratchet wheels 92 and 93, respectively, to effect the rotation of the shaft in the manner described.

Alternate structure of measuring vessel

Figures 5, 6:
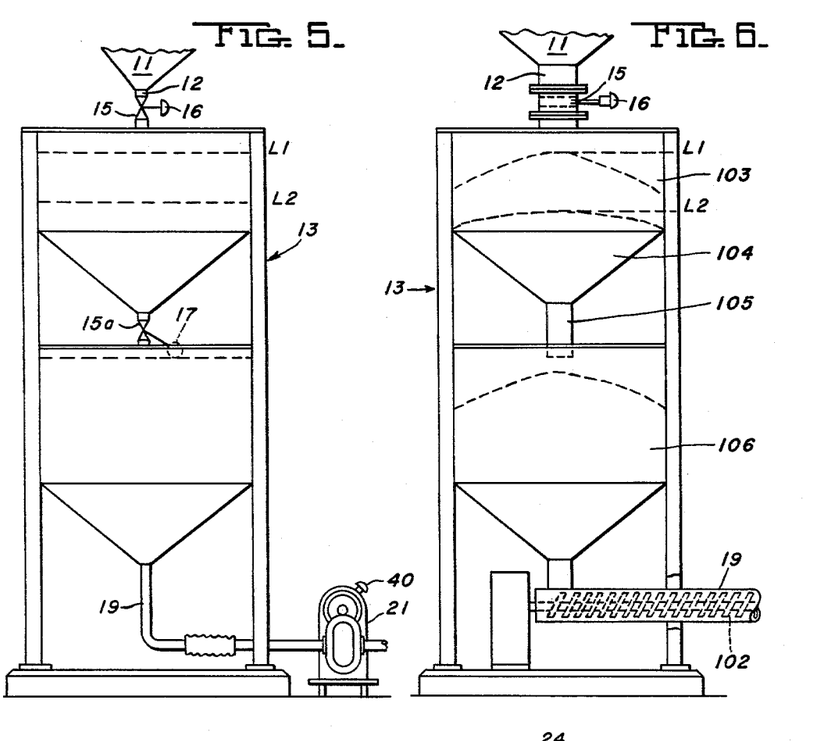
FIG. 5 is an elevational view showing a preferred measuring vessel employed in a metering system for handling liquid substances as in FIGS. 1 and 2.
FIG. 6 is an elevational view showing a preferred measuring vessel employed in a metering system for transfer of divided solid or bulk materials to a vessel as in FIGS. 1 and 2.

The structure of the vessel 13 has been designed as depicted in FIGS. 5 and 6 to eliminate as much as possible the effect of a supply head on the rate of discharge of material through the conduit or pipe 19, FIGS. 1 and 2. As can be appreciated, a change in the level of material in the vessel 13 modifies to some extent the material supply head or hydrostatic pressure above the conduit 19 and affects the rate of flow from the vessel.

To obviate the effect of this change of level, a double hopper measurement vessel 13 may be provided as shown in FIG. 5. During the sampling or metering period only the top hopper experiences a change in level so that the head on the pump 21 remains substantially constant during this time and the flow rate is not subject to possible errors due to a change in pressure head.

In FIG. 6, which illustrates an apparatus for pacing the feed of dry material, the vessel 13 is also constructed to eliminate the effect of a changing head on the screw conveyor 102. Here there is illustrated an upper hopper 103 as part of the measuring vessel 13. It has a funnel-shaped bottom 104 with a conduit 105 extending into a lower hopper 106 which is of a configuration similar to that of the upper hopper. The supply of material from the upper hopper 103 to the lower hopper 106 is stopped when the level of the ingredients in the lower hopper covers the opening of the conduit 105. During the period of measurement of ingredients, only the level of material in the upper hopper changes, and, accordingly, the pressure head on the screw conveyor 102 remains substantially constant during the period of measurement.

In the modification shown in FIGS. 8 and 10 there is illustrated a system wherein the level in the measuring vessel 13 is controlled by weight instead of by a float valve as disclosed in FIG. 1. Also in these figures the vessel 13 is illustrated as being suspended from a scale beam 111 through a member 112 adjustable along the beam. The beam actuates an air valving mechanism 113 through which air under pressure from the source marked As is transmitted to line 113a in accordance with the weight on the arm or beam 111. In FIG. 8, 114 is a rigid support from which the beam 111 is suspended through connection 116 and the air valving mechanism is suspended from the fixed support 114 through suspension means 115.

Figure 9:
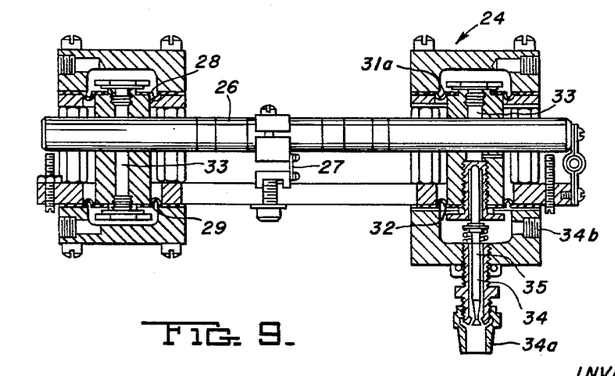
FIG. 9 is a longitudinal sectional view of one type of pneumatic resolver, shown graphically in FIG. 1, for differentiating the actual rate of transfer from the desired rate of transfer of material from a measuring vessel to a receiver or blend tank.

The air pressure in line 113a is continuously transmitted through line 113b to the resolver designated generally 110 and which is generally similar to the resolvers hereinbefore described. It has a chamber 117 connected to an air supply As to control set point level L of vessel 13. Opposite it is a chamber 118 to which line 113b is connected. These chambers are connected to one end of a lever 26b as in the other resolving units, which lever is supported on a fulcrum 27. At the opposite end of the lever 26b are diaphragm chambers 31a and 30. The latter chamber is similar to the chamber 32 of FIG. 9 and as shown in FIG. 9, chamber 32 includes a poppet valve 34 with a valve element 35 which is moved up and down in valve body 33 by the lever 26, FIG. 9. As the pressure in lines 113a and 113b varies with the load in vessel 13 relative to the air supply pressure in 117, the beam 26, FIG. 9, is moved up or down, increasing or diminishing the flow of air between inlet 34a and outlet 34b. This changes the air pressure in pipe 119, FIG. 8, to control a variable flow valve 121 in discharge pipe 22.

Pump 21 discharges material from the supply source constantly into the vessel 13. The resolver 110 maintains the output through discharge valve 121 and pipe 22 at a rate such as to keep the operating level in the vessel between the dotted line positions L and L-1, FIG. 8. During the sampling period the valves 15 and 15a are closed by the opening of the electrical circuit including line 55, as in the arrangement shown in FIG. 1, and the level will rise in the vessel 13 in some range between approximately the level of line L-1 and the level of line L-2. The computer 24, corresponding to resolver 24 in FIG. 1, but which may actually have the construction indicated more precisely in FIG. 9, operates in the manner previously described in connection with FIG. 1 to transmit signals through line 61 to the chamber 37 of a second resolver 25, which corresponds in function and general arrangement to the resolver 25 of FIG. 1. The resolver 25 is effective to transmit an air impulse through line 43 to a positioning device 39 and the speed changing device 50 of the pump 21. As explained in connection with FIG. 1, if the level in the vessel 13 changes at too rapid a rate during the time that the valve 15 is closed, indicating a too rapid rate of discharge from the supply source, the pump will be slowed down, but if the gain in weight in the vessel 13 is too slow, the resolvers 24 and 25 will function to cause speed-up of the pump 21. The level controller comprising the resolving unit 110 must function between each measuring cycle to bring the level in the vessel 13 from the maximum height L-2 to the normal range between L-1 and L before the next cycling operation. An integrator and recorder instrument 40 is connected to the output line 61 from the resolver 24 to record both the rate of flow and the total amount of material passed through the system.

While FIG. 8 shows a system with the customary operating pump 21 on the supply line of the vessel 13, and the interrupting flow on the discharge side of vessel 13, FIG. 10, which is otherwise the same, reverses this condition so that it functions the same as the arrangement specifically illustrated in FIG. 1 where the constantly operating drive member 21 is on the discharge side of the measuring vessel 13 and the supply to the measuring vessel is intermittently controlled through the cut-off valve 15 and the variable flow valve 121.

Figure 11:
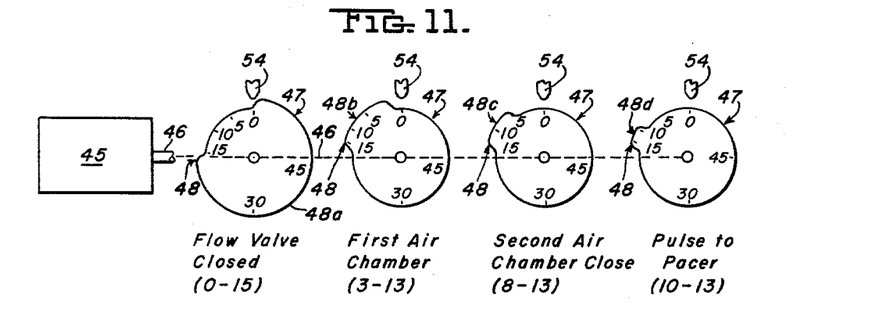
FIG. 11 is a diagrammatic view of a programmer or timer for the systems disclosed in FIGS. 1, 8 and 10 for sequencing the operation of the electro-mechanical embodiments of the invention.

Timing or sequencing of valve operation for measuring and for comparing the rate of accumulation of material in vessel 13 with a predetermined rate is accomplished by the timing motor 45 and associated circuitry as described hereinbefore in regard to FIGS. 1 and 11. That is, the valve 15 is closed when cam lobe 48a clears the microswitch plunger 54, after which valves 62 and 63 are closed and valve 64 opened during the measuring period while the valve 15 is retained closed. After the differentiation of actual rate of material accumulation with the required rate of material accumulation by resolvers 24 and 25, and correction of the speed of the pump 21 through controller 50 accordingly, the valve 15 is again opened for the normal operating period as governed by the programmer or timer comprised of the motor 45, cams 48 and the circuitry including the solenoids of the respective valves of the system.

The valve 15a is also operated by series connection to the solenoid of controller 16' at the time of opening or closing valve 15 whereby the level controller is ineffective when valve 15 is closed.

The instant invention thus provides a material transfer method and apparatus in which an increase or decrease in the rate of transfer of material with relation to a preselected standard is compensated for to maintain a mean or average rate of transfer. Material is metered to or from a receiver whereupon a desired discharge or feed of a continuous quantity of material per unit of time is accomplished. Thus, according to this invention, a transfer system incorporates between a feeding station and a receiving station an intermediate measuring vessel into and from which the material flows. A variable speed drive is incorporated in the system, either preceding or following the measuring vessel, so as to increase the rate of flow into the intermediate vessel or the removal of material therefrom. There is incorporated in the transfer system at the opposite side of said vessel from the variable speed means a means for temporarily stopping or cutting off the flow of material into or from the intermediate vessel for a predetermined time interval. Depending on the relative locations of the variable speed means and the flow stopping means, there occurs a change in the amount of material in the intermediate vessel which may be detected by change of weight or change of level. If the variable speed means is located in the system at the outlet side of the measuring vessel and the shut-off means on the input side of this vessel there will be a decrease of material in the vessel when the feed to the measuring vessel is blocked but continues to feed to a receiving vessel. If, however, material is to be removed from a vessel at a constant rate, the shut-off is at the outlet side of the sensing vessel and the variable speed drive on the inlet thereto. The sensing mechanism, whether responding to an increase or drop in level in the sensing vessel, is fundamentally the same.

In each of the embodiments as heretofore described, there is instrumentation which indicates the rate of flow and controls the speed of a variable speed material transfer means such as the pump 21 of FIG. 1 or the screw conveyor 102 of FIG. 6. The invention, however, may be used without such rate of flow control to indicate merely the total amount of material transferred irrespective of its weight. If, for example, the instrument 40 records only the rate of flow at each test cycle, the average of such recordings over a period of time will give a close indication of the total amount transferred. Instrumentation at 40 may be a known type of integrating or calculating recorder that will continuously record the average. In this way, even though the transfer of material might occur intermittently or at variable rates, as for example the flow of water to a plant or individual apparatus, the hourly or daily consumption can be determined within reasonably close limits. The same thing will of course apply to the use of the invention in the handling of dry materials, and it is applicable to any of the modifications herein disclosed where an instrument such as the instrument 40, or a modification thereof, records only the actual rate with no control of this rate through the addition of drive speed control of the transfer means. If, for instance in FIG. 6 there were a gate to close the discharge from outlet 105 of hopper 104 and during a test cycle or series of test cycles this gate were closed, the recorder would drop from a normal rate of discharge based on the maximum capacity of the screw conveyor 102 to zero. The same thing would apply in FIG. 1 if the pump 21 were stopped or a valve in pipe 19 were to be closed. With liquids or with solids there is a supply line to the measuring vessel, a receiving line leading from said vessel, and means for interrupting the flow of material along one of the lines while the other continues in operation with means for detecting the change in the amount of material in the measuring vessel during the period of interruption. It may work on a gain of weight or a loss of weight, but the amount of change is then interpolated into rate of flow.

It is manifest that the above-described embodiments of the invention are merely illustrative and that numerous modifications may be made within the spirit and scope of the invention, and that various instrumentations known to the art may be used for effecting a change of speed of a driving motor or operating other speed changing mechanism in response to a change in the amount of material in the measuring vessel during the measuring cycle. So far as applicable modifications shown in one form may be substituted in another, as for example, the gain-of-weight system may be used with the conveyor system of FIG. 6. Also, the conduits interconnecting the sensing vessel 13 with the source of material and leading from the vessel to a delivery station may be substituted by conveyors or other suitable transfer devices with speed regulation through a variable drive means.

What is claimed is:

1. A transfer system comprising a feeding means at a first station and a receiving means at a second station and means for carrying material from one station to the other, a measuring vessel in the system intermediate the two stations, means intermediate the measuring vessel and one station for cutting off the transfer of material through the system for regular predetermined time inand the adjustable speed driven means being responsive to the energization of the solenoids to advance and retard the rate of transfer of material by the adjustable speed driven means.

12. A rate of flow metering system comprising a supply receptacle, a vessel flow connected to the receptacle for gravity feed of material to the vessel, adjustable speed driven means for transferring material from the vessel, a valve for cutting off the flow of material to the vessel from the receptacle for a set period of time, a valve controller connected operatively to the valve, a timing relay for actuating the valve controller at regular recurring intervals for closing the valve for the set period of time, a mechanical scale for indicating the weight of material transferred from the vessel by the adjustable speed driven means at different instances during the set period of time, electrical means responsive to the indication of weights on the scale for comparing the time sequence of indication of the weights of material in the vessel at difference instances of time during the material cut-off period with a desired time sequence, and means responsive to the electrical means for changing the adjustable speed driven means whereby deviation of the actual rate of transfer of material from the vessel from a predetermined rate is corrected.

13. A system as in claim 12 wherein the vessel includes at least two material hoppers aligned vertically and flow connected whereby the pressure head of material above the transfer means is maintained uniform during transfer of material by the transfer means.

14. A rate of flow metering system for automatically controlling the rate of continuous transfer of flowable material from a receptacle comprising an adjustable speed driven pump flow-connected to the receptacle from which material is to be transferred at a uniform rate, a vessel having an inflow connection flow-connected to the pump, an outflow conduit connected to the vessel at a location below the inflow connection of the vessel, valve means for opening and closing the outflow conduit, means for sensing the gain in weight of material in the vessel for a preset measuring period while the valve means maintains the conduit closed and the pump continues to transfer material to the vessel, and means for controlling the speed of the adjustable speed driven pump responsive to material gain-in-weight deviation from a predetermined gain-in-weight for the measuring period whereby the transfer of material from the receptacle is maintained at a desired substanially uniform rate and the transfer is uninterrupted.

15. A system as in claim 14 including timer means for sequencing the operation of the system repeadedly from a measuring period to a non-measuring period whereby the valve means is opened and closed periodically.

16. A method for regulating the flow of material in a path from a source of material supply to a receiver comprising the steps of moving the material from the supply source to the receiver through a system including an intermediate vessel periodically stopping the flow of material from the source to the intermediate vessel, for a set period of time, measuring the rate of flow to the receiver of material from the intervening vessel to the receiver during said period of time that the flow to the intermediate vessel is stopped while continuing to remove the material from the intermediate vessel, comparing the actual rate of flow from the intermediate vessel to the receiver with a preselected desired rate of flow, and changing the rate of flow to the receiver in accordance with the result of the comparison of rates whereby the flow of material to the receiver is uninterrupted and the actual rate is paced to the preselected desired rate.

17. A method of controlling uninterrupted transfer of material from a receptacle at a uniform rate comprising transferring the material from the receptacle to a vessel, discontinuing the transfer of material from the vessel for a preset period of time, measuring the gain in weight of material transferred from the receptacle to the vessel for the preset time, comparing the measured gain in weight with a preselected desired gain in weight of material at the vessel, regulating the rate of transfer of the material from the receptacle in accordance with the deviation of the actual gain in weight of material with the preselected desired gain in weight while continuing the transfer from the receptacle, and then continuing the transfer of material from the vessel at the re-established rate.

18. A system for measuring the rate of flow and the total amount of material flowing past a station comprising a measuring vessel interconnected between the input and output of the system, computing means connected to the measuring vessel for sensing the rate of flow of material through the vessel, and integrating and recording means connected to the computing means for recording the rate of flow and the total amount of flow of material through the vessel.

19. A material transfer and measuring apparatus comprising a supply line and a receiving line, a measuring vessel interposed between the supply line and the receiving line into which the supply line delivers material and from which the material is discharged to the receiving line, means in one of said lines for interrupting the flow of material therealong at regular time intervals for periods of equal duration while flow continues along the other line, and means responsive to the change in the amount of material in the vessel during such period of interruption for determining and recording the rate of change in the amount of material in said vessel during each such period of interrupted flow.

References Cited by the Examiner
UNITED STATES PATENTS
2,712,408   7/1955   Weber ______________ 222—55 X LOUIS J. DEMBO, *Primary Examiner.*

HADD S. LANE, *Examiner.*